Patented July 26, 1949

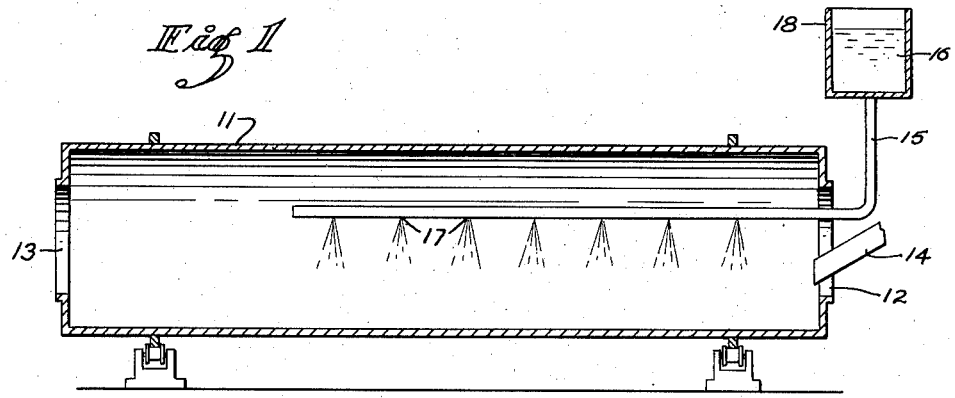
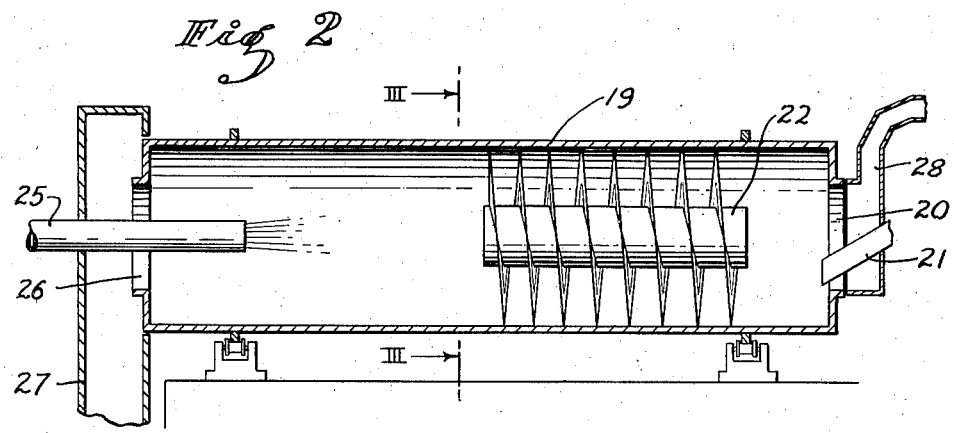
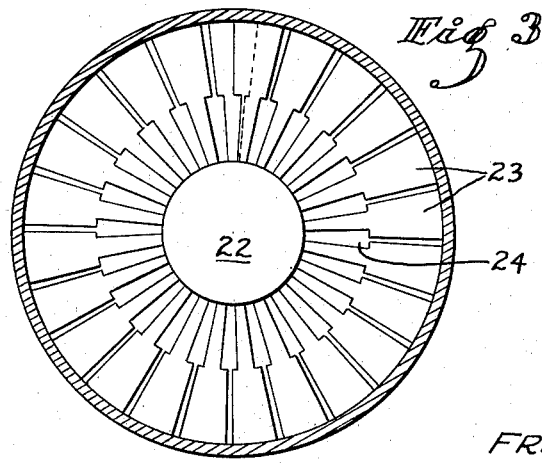

2,477,412

UNITED STATES PATENT OFFICE 2,477,412

PREPARATION OF FURNACE FEED

Fred Lohse, Oakland, Calif., assignor, by mesne assignments, to The Permanente Metals Corporation, a corporation of Delaware Application November 30, 1944, Serial No. 565,975

3 Claims. (Cl. 75—67)

This invention relates to a process for preparing mixtures containing a magnesium compound, and more particularly to a process for preparing such mixtures containing also a carbonaceous reducing agent which are to be reacted at the proper temperatures for the production of magnesium metal.

It has long been known to produce magnesium metal by heating to the proper temperatures, as in an electric, or electric arc, furnace, a mixture of a magnesium compound, such as magnesium oxide for example, with a carbonaceous reducing agent which may be carbon, coke, coal or the like, and subsequently condensing the vaporous products of reaction and refining the crude magnesium so produced.

There are several problems inherent in this process. For example, it has been difficult to attain smoothness of furnace operation in the reduction step. That is to say, it has been difficult to maintain a constant rate of reaction and to prevent surges, or sudden changes in the amount of gaseous products given off by the reaction. For various reasons, utilization of the electric input has been hitherto quite erratic, not only requiring constant adjustment of the electrodes and feed bed, but also resulting in the aforementioned sudden changes in the amounts of products given off. These products are in the vapor state and go directly to a chilling device where, to prevent back-reaction of the magnesium vapor and carbon monoxide to MgO and carbon, they are cooled as suddenly as possible by admixture with a gaseous chilling medium. It can readily be understood that a sudden increase in the volume of gaseous reaction products will result in less efficient cooling since the input of chilling medium is ordinarily at a constant rate. This, in turn, tends to increase the extent of back-reaction and reduces thereby the efficiency of conversion to magnesium metal. By maintaining a constant rate of reaction, on the other hand, the conditions of chilling would be kept more constant and the final product correspondingly improved with respect to its content of magnesium metal.

In this process of reduction it has also proved difficult to cause the magnesium compound and the carbonaceous reducing agent to react to completion and to avoid carrying over into the condensed product unreacted particles of magnesia, coke or other constituents of the starting mixture. The occurrence of such dusting and carry-over is not only inefficient in that the reaction is incomplete and less magnesium vaporizes out of the reaction zone, but it is also a positive detriment in that the dust carried over further dilutes the magnesium metal content of the condensate.

It is an object of this invention to provide an improved magnesium compound-containing mixture for use in reaction involving magnesium, for example the reduction of magnesia by a solid carbonaceous agent, which insures intimate admixture of the components and which results thereby in more complete reaction. It is a further object of this invention to prepare a shaped mixture as described above which, when used as a furnace feed, has increased strength and which is relatively non-dusting under conditions of handling and treatment. These and other objects will be more clearly shown by the description which follows.

According to this invention an improved magnesium compound-containing mixture is obtained by grinding together a magnesium compound and a solid carbonaceous reducing agent, admixing therewith a binder which is liquid under the conditions of operation, and forming the resulting mixture into nodules. In particular, the magnesium compound-containing mixture is made by intergrinding a magnesium compound such as magnesium oxide, magnesium hydroxide or the like and a solid carbonaceous reducing agent such as coal, coke or the like, and admixing as a binder waste sulfite liquor, molasses or a solution or emulsion of asphalt, or liquified pitch or tar, and forming into nodules.

The strength and resistance to abrasion of the formed nodules can be still further increased by drying the nodules thoroughly after their exit from the nodulizing zones. The drying step may be carried out advantageously at temperatures above the boiling point of the liquids added in the nodulizing operation, for example, in the case of asphalt dissolved in a liquid hydrocarbon, drying may take place at 150° C. The drying may be effected in any suitable apparatus, such as a rotary drier or a grate. After drying it is advantageous to screen the nodules to remove any particles which may have been abraded off by the rubbing of moist, softer nodules against other nodules or the drying surfaces.

Any liquid binding agent can be used in the nodulizing operation but a hydrocarbon composition is especially advantageous as the carbon available therefrom is useful in the reducing step when the nodules formed are subjected to treatment in an electric arc furnace to produce magnesium therefrom. However other binding agents including waste sulfite liquor, whereof the effective constituent is probably the ligninsulfonic acid or the salt thereof, molasses and the like are also useful as binders for the intergrind. The amount of binder added is in general a small proportion of the total weight of the mixture. In other words, just enough binding agent is added to provide nuclei around which nodules will build up but the addition of more than this amount is not economical.

In some cases it is advantageous to add a wetting agent, such as a sulfonated or sulfated alcohol or similar compound, in order to facilitate the action and the penetration of the binding agent. It is convenient to add the wetting agent to the binding agent prior to the addition of the latter to the intergrind. The wetting agent is preferably added in the amount of not over about 1.5% by weight of the binder.

As stated above, this process is particularly useful in preparing feed mixtures to be used in an electric arc furnace wherein magnesium is produced by the reduction of a magnesium compound, such as magnesium oxide, with a solid carbonaceous reducing agent, such as coke, coal, graphite, carbon or the like. It is usually preferable to employ magnesium oxide as a starting material but it is sometimes satisfactory to employ as a starting material magnesium hydroxide, for example as recovered from sea water by treatment thereof with dolomite, or to employ magnesium carbonate or the like, in the preparation of the formed nodules, especially when the formed nodules are subjected to a coking treatment prior to the reduction step.

The proportions of magnesia, for example, and carbon suitably employed in such a reaction mixture are in general well known in the art and may be said to be stoichiometric, or some excess of carbon over that theoretically required for the reduction of the magnesia is ordinarily employed.

The accompanying drawings show somewhat schematically an apparatus which is especially suitable for carrying out the nodulizing step of the present process. In the drawings:

Figure 1 shows a vertical section along the longitudinal axis of a nodulizing drum;

Figure 2 is a vertical section along the longitudinal axis of the drying drum and Figure 3 is a vertical cross-section along the line III—III of Figure 2.

In the figures the nodulizing drum in Figure 1 is a nodulizer of conventional type having a cylindrical shell 11 closed at both ends but having aperture 12 in one end through which material to be nodulized is fed into the drum, conveniently by means of chute 14 and through which the conduit 15 for liquid binding agent enters, and having aperture 13 in the opposite end of the drum through which the formed, but still moist, nodules are withdrawn in any convenient manner. The liquid binder 16 is sprayed onto the material by means of pipe or conduit 15 having apertures at 17. The binder is held or stored in a convenient receptacle 18 and flow to the spraying apertures may be controlled by a suitable valve in pipe 15 (not shown). If it is desired to feed heated binder, container 18 may be heated by any convenient means. Sometimes it is desirable to scrape the material from the drum as it rotates and this may be effected by disposing in the drum above its longitudinal axis a reciprocating arm carrying suitable knives adapted to scrape the moistened material off, permitting it to drop or tumble back to the bottom portion of the drum. The nodulizer is mounted and actuated in the known manner.

The drying drum shown in Figures 2 and 3 is a horizontal drum having a cylindrical shell 19, in one end of which is aperture 20 through which passes chute 21 by means of which the nodules to be dried are fed into the drum. Toward the end of the drum at which the nodules enter there is disposed therein hollow cylinder 22 closed at both ends and receiving in slots in its surface the smaller ends of a series of heat-exchanger baffles 23, which are shown more clearly in Figure 3, such ends, if desired, being provided with suitable lugs to prevent slipping of the drum. The baffles 23 are bolted or otherwise fixed to the inner surface of drum 19 and support cylinder 22 at the central portion of the drum. Baffles 23 are disposed about the surface of cylinder 22 in such a manner as to form a spiral, in effect a screw conveyor for the nodules, the baffles being disposed to the side of each other and continuously slightly displaced longitudinally of the drum. Each baffle fits rather closely to the next baffle near the inner surface of the drum, while the portion of the baffle nearer the cylinder 22 is narrower and provides openings 24 through which heated gases pass. Cylinder 22 acts to deflect hot gases, passing toward aperture 20 from burner 25, toward the heat exchangers 23. In drum 19 is also aperture 26, at the outlet end, through which burner 25 enters the drum and by way of which the dried nodules leave the drying drum. The nodules leaving the drier pass out through take-off conduit 27 and may be stored or used directly.

In one method of carrying out my process, magnesium oxide and coke in such proportions that there is a slight excess of carbon over that theoretically required for reduction of the magnesium oxide, i. e. about 70 parts by weight of substantially pure MgO to about 30 parts by weight of coke where the coke is petroleum coke, are ground together until thoroughly mixed and very finely divided, or until 90% of the interground material passes 200 mesh. To the intergrind is now added by spraying a solution consisting of asphalt diluted with a hydrocarbon solvent in the proportions of 1:4 while the intergrind passes through the nodulizing drum which is rotated at about 6 to 12 R. P. M. Suitably the asphalt mixture is heated to a temperature at which it is liquid and sprays easily. With the mixture given, such a temperature is around 70° C. The moist nodules are all drawn off at 13 and are then fed into the drying drums at 22. The nodules pass inwardly (both the nodulizing and drying drums being slightly inclined toward the exit end), and over heat exchangers 23. As drum 19 revolves heat exchangers 23, spirally disposed, act as a screw conveyor and impel the nodules in the direction of burner 25. Hot gases are introduced into the drying drum by burner 25 which is located at the axis of the drum near the exit end. These gases pass toward the entrance end of the drum and eventually pass out the entrance aperture by way of duct 28. As the gases come into contact with the nodules near the burner, both gases and nodules are at the highest temperatures which they attain. The last traces of volatile materials are evaporated from the nodules in this region. As the gases pass toward the forward end of the drum, counter-current to the flow of nodules, transfer of heat from gases to nodules and removal of volatile material by the gases continue, the gases becoming cooler and more saturated as they approach their exit zone. When the gases reach the zone near the entrance to the drum the transfer of heat from the gases to the nodules which there have the highest percentage of volatiles and the lowest temperature is facilitated by metal baffles, or heat exchangers 23, along which the nodules tumble. Contact of gases with nodules is also facilitated by hollow drum 22, closed at both ends, which forces the gases to pass through the openings in the heat-exchanger baffles. The heat exchangers absorb heat from the gases and in turn impart it to the nodules in contact with the exchangers.

The nodules pass from the entrance end of the drying drum, over the heat exchangers and into the central portion of the drum where they attain temperatures of from about 500° F. to about 700° F. and are thoroughly dried. They pass on through exit aperture 26 and are drawn off at 27 at a temperature of about 400° F. to about 600° F. The nodules are now screened, suitably to recover those averaging about one-half inch in diameter but not exceeding one inch diameter. The nodules are quite hard and exhibit very little dusting under abrading conditions.

In another run in the same devices as described above the charge is varied by admixing, with the same magnesia-coke intergrind composition, a binding agent comprising waste sulfite liquor to which four parts by weight of water has been added. The interground mixture is moistened with the binder by revolving the intergrind in the nodulizer drum while spraying with the binder. The nodules which are formed in the nodulizer pass to the drier and are dried as described above. They average about three-eighths inch in diameter, and are very hard and resistant to abrasion.

An advantage obtained by the preparation of magnesia-carbon nodules as described above is that such nodules, when treated in an electric furnace to reduce the magnesia and evolve magnesium vapor, showed less resulting deposit of material around the charge hole, thereby reducing the necessity for reaming out the charge hole and resulting in more efficient furnace operation.

The nodulization step can be carried out at room temperatures, or it can be performed at higher temperatures and when a hard asphalt is employed as a constituent of the binder solution it is advantageous to nodulize at a temperature where the binder is freely flowing liquid.

The nodules formed can be advantageously heated to cause coking, if so desired, when a coking coal is employed as the carbonaceous reducing agent, or when the binder is capable of being coked.

The drying step has been described as being carried out in the specific type of apparatus shown in the drawings, but this step can also be performed in a grate drier or other type of drying device.

It is to be understood that the above drawings and examples have been given for the purpose of description only and that modifications and variations may be made therein without departing from the spirit and scope of this invention.

While the invention has been described above with particular reference to a starting material made by intergrinding the solid components thereof, it is to be understood that magnesium compound-containing mixtures can also be prepared by the process of this invention by admixing without intergrinding, a finely divided magnesium compound, such as magnesium oxide, with the desired proportion of a finely divided solid carbonaceous reducing agent and forming the intimate mixture so prepared into nodules with a nodulizing binder which is liquid under the conditions of operation.

What is claimed is:

1. Process for preparing a magnesium oxide-containing mixture for the production of magnesium by reduction of magnesium oxide with a solid carbonaceous reducing agent which comprises intergrinding magnesium oxide and a solid carbonaceous reducing agent, nodulizing the intergrind while spraying with a liquid binding agent comprising asphalt dissolved in a liquid hydrocarbon, and drying the formed nodules.

2. Process for preparing a magnesium oxide-containing mixture for the production of magnesium by the reduction of magnesium oxide with carbon which comprises grinding together magnesium oxide and coke, nodulizing the interground mixtures while spraying with a heated liquid binding agent comprising asphalt dissolved in a liquid hydrocarbon, and drying the formed nodules.

3. Process for preparing a magnesium oxide-containing mixture for the production of magnesium by the reduction of magnesium oxide with carbon which comprises grinding together magnesium oxide and a solid carbonaceous reducing agent, nodulizing the interground mixture while spraying with a liquid binding agent comprising asphalt dissolved in a liquid hydrocarbon, drying the formed nodules, and heating to cause coking.

FRED LOHSE.

REFERENCES CITED

The following references are of record in the file of this patent:

UNITED STATES PATENTS

| Number | Name | Date |
| --- | --- | --- |
| 1,467,797 | Klugh | Sept. 11, 1923 |
| 1,650,893 | Koehler | Nov. 29, 1927 |
| 1,661,636 | Simpson | Mar. 8, 1928 |
| 1,835,460 | Bunce | Dec. 8, 1931 |
| 1,865,554 | Bradley | July 5, 1932 |
| 1,875,249 | Mahler | Aug. 30, 1932 |
| 2,025,740 | Hansgirg | Dec. 31, 1935 |
| 2,205,658 | Kirk | June 25, 1940 |
| 2,286,209 | Kirk | June 16, 1942 |
| 2,328,202 | Doerner | Aug. 31, 1943 |

OTHER REFERENCES

Abraham, "Asphalt and Allied Substances," 4th edition, D. Van Nostrand Co., New York, 1938, pages 62–63 and 354–355.